UNITED STATES PATENT OFFICE.

WALLACE APPLETON BEATTY, OF NEW YORK, N. Y.

SYNTHETIC GUM.

1,225,749.     Specification of Letters Patent.     Patented May 15, 1917.

No Drawing.     Application filed June 30, 1915. Serial No. 37,337.

*To all whom it may concern:*

Be it known that I, WALLACE APPLETON BEATTY, a citizen of the United States, residing at New York, in the county of New York and State of New York, have invented certain new and useful Improvements in Synthetic Gum; and I do hereby declare the following to be a full, clear, and exact description of the invention such as will enable other skilled in the art to which is appertains to make and use the same.

This invention relates to a new substance or compound and to a method of producing the same, and has for one of its objects the production of said compound in an efficient and comparatively inexpensive and expeditious manner.

With this and other objects in view the invention consists in the novel substance or compound constituting my new article of manufacture, and in the novel steps and combinations of steps constituting my method or process, all as will be more fully hereinafter disclosed and particularly pointed out in the claims.

More particularly stated the purpose of the invention is to produce an artificial and inodorous gum to be used in the various arts, especially for coating, lacquering, and in solid forms for the production of articles of manufacture.

Stated generally the compound, or gum is made by mixing acetone or its homologues with phenol or certain of its homologues, to produce a condensation product, which product is later treated with formaldehyde or one of its polymers to produce a second condensation product which latter in turn constitutes my new gum, as will presently appear. In other words the process is carried out in two steps, first consisting for example of the condensation of acetone with phenol to produce the condensation product known as dioxy diphenyl dimethyl methane which product is later treated with formaldehyde to produce the second condensation product constituting my new gum.

A specific example of the carrying out of this process may be given as follows: I may mix together eight hundred and forty (840) parts by weight of phenol, one hundred and seventy five (175) parts by weight of acetone, and eighty four (84) parts by weight of hydrochloric acid (HCl) having a specific gravity of 1.20. This mixture is allowed to stand at from 30° C. to 40° C. until the entire mass becomes solid to form the first mentioned condensation product which has a crystalline structure. I am not limited, of course, to hydrochloric acid in producing this first condensation product, for sulfuric acid ($H_2SO_4$) may be used, or other acids, having the same condensing properties.

The crystals thus produced are next washed with dilute acetic acid, and if necessary are recrystallized from hot water, or dilute acetic acid and dried. The purpose of this purification is to get rid of the remaining carbolic acid and any other impurities that may be present. The dioxy-di-phenyl-dimethyl-methane thus produced will be found to consist of a colorless mass of crystals melting at 150° C. to 154° C. free from odor, and soluble in all ordinary organic solvents such as alcohol, acetic acid, ethyl acetate, etc., but practically insoluble in water. The reaction producing this first named product may be written as follows:

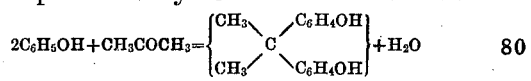

Having produced and purified the first condensation product I proceed to form the second condensation product or gum as follows: The above crystals are dissolved in a hot solution, of 40% formaldehyde, in such quantities as will preferably contain exceeding sixty parts of formaldehyde to two hundred and twenty-eight parts dioxy-diphenyl-dimethyl-methane. These proportions may, of course, be varied.

To this mixture of crystals and formaldehyde is added a few parts by weight of a substance having an acid or an alkaline reaction to effect the condensation of the formaldehyde with the crystals in order to produce the second condensation product or gum. The substance thus added may be in the form of an acid, but is preferably in the form of an alkali, or an alkaline earth hydrate, or a salt having an alkaline or acid reaction. Sodium hydroxid, ammonia, or an amin are generally used. The quantity of the alkali or acid used will of course vary with the nature of the substance added, and may be readily determined by experiment in each case.

A specific example of the production of the gum from the above crystals and formaldehyde may be given as follows: To the above designated quantity of 40% formaldehyde and to each one hundred grams of crystals may be added one gram of sodium hydroxid (NaOH) which will be sufficient to produce the desired result although more may be used. The temperature is now raised to 100 degrees centigrade and the reaction proceeds to completion. Usually the heat of the reaction is sufficient to maintain it, so the external heat is removed. After a time, when the reaction has moderated, external heat is applied to raise the temperature again to 100° C. and the heating continued until the desired viscosity is attained. This requires about one hour. It is preferable to heat the mixture in a closed vessel. The liquid on standing separates into two layers, the upper of which consists of the excess of aldehyde and alkali dissolved in water, and the lower of which is the gum. This gum is next drawn off, washed with water and dried in a vacuum at 50 degrees centigrade.

The reaction occurring between the dioxy-diphenyl-dimethyl-methane and the formaldehyde during the first heating probably is as follows:

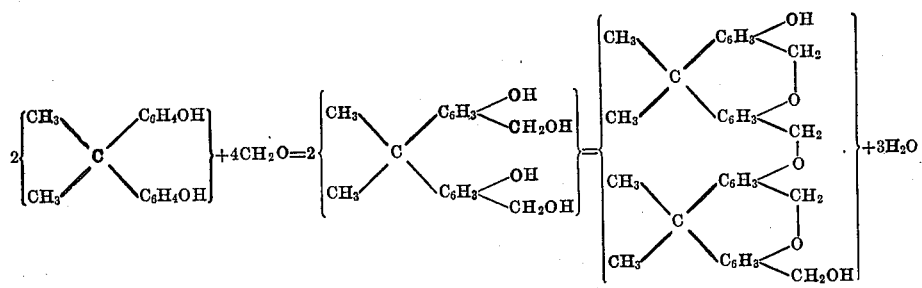

Upon further heating, further reactions take place, in which more water is liberated. The gum is inodorous and varies from a practically colorless and transparent, to a dark brown mass depending on the duration of the heating, the amount of the alkali, the kind of alkali used, and on the purity of the dioxy-diphenyl-dimethyl-methane crystals. The gum is soluble in strong alkali, and very brittle; but if acids are added to a solution of the gum in alkali a gum is precipitated which is insoluble in alkali. The gum is soluble in alcohol, acetone, glacial acetic acid, amyl alcohol, amyl acetate, and acetylene, tetrachlorid, or mixtures of these. It is insoluble in oils, as linseed oil, turpentine and mineral oils.

On heating the gum thus produced below 100 degrees centigrade for a longer time, depending on the thickness of the layer, or a shorter time at 150 degrees centigrade, the gum passes gradually through different stages of less and less solubility toward the reagents which originally affected it until it becomes insoluble in its former solvents and only slightly affected by strong alkalis and acids. It is now an inodorous, transparent mass, very strong, nonbrittle, and tenacious, instead of brittle as formerly, very hard, and will not burn unless kept continually in a flame. In this condition no solvent has been found for it.

As stated above, ammonia, formaldehyde and the crystals may be used to produce the gum, but it has been found possible to produce the gum with a condensation product of formaldehyde and ammonia only; namely, hexamethylenetetraamin. The advantage of using this last named method consists in obtaining a dry product in one step. It has been found that hexamethylenetetraamin in the presence of dioxy-diphenyl-dimethyl-methane breaks down when they are heated together, giving the same result as when the latter substance is heated with ammonia and formaldehyde, ammonia being evolved. The reaction with a formaldehyde solution and ammonia is undoubtedly the same as with the hexamethylenetetraamin. In both cases we have the ammonia evolved and taking no part in the reaction except as a catalytic or condensing agent.

The method of carrying out the reaction of this last named process is as follows: Six hundred and eighty-four parts of dioxy-diphenyl-dimethyl methane crystals are melted at the lowest possible temperature (about 150 degrees centigrade) and to these are added, in a fine powder, one hundred and forty parts of hexamethylenetetraamin The reaction begins immediately, ammonia being evolved. Care should be taken, however, that the product is heated just sufficiently to produce the evolution of ammonia, because as soon as the gum begins to be formed owing to the heat evolved it is not necessary to maintain it at the temperature of 150 degree centigrade used in the beginning.

The reaction with hexamethylenetetramin $(CH_2)_6N_4$ may be represented as follows:

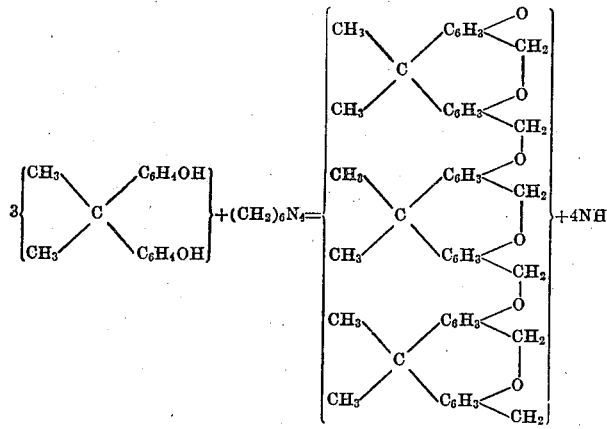

We have now a gum similar to the first form of gum described above, and which passes on further heating into an insoluble mass similar to the second form also described above.

Of course, aldehydes other than those mentioned above may be employed and still produce substantially the same gum.

It will thus be seen that an important feature of my invention resides in the fact that by employing the comparatively inexpensive materials consisting of acetone and phenol I am enabled to produce a raw base material (the above named dioxy-diphenyl-dimethyl-methane), in a crystalline form, which is capable of being inexpensively washed and purified, thus freeing it from carbolic acid so that the subsequent reaction between these crystals and formaldehyde produces at a very low cost a gum of great purity, very light in color or transparent, and capable of a wide range of uses.

In my co-pending application #702,046, artificial gum, filed June 6, 1912, I have disclosed and claimed the soluble or fusible form of my gum. This application, on the other hand is directed to the insoluble or infusible form of the gum. A more specific statement of the preparation of the insoluble form is as follows:

(a) I obtain the soluble fusible gum as above disclosed and make it neutral by adding acid, say 1% $H_2SO_4$ in alcohol until it is neutral. This addition can be conveniently made at the time the liquid on standing separates into two layers, and care should be taken to have the gum exactly neutral to indicators. When the gum is washed as described, care should also be exercised to wash it free from soluble salts, formed by neutralizing the alkali. Care should further be used to dry it not further than when it is free from water. It then remains plastic when heated to about 60° C., but on cooling to 25° C. or to room temperature, it is a brittle mass. When the gum is in this condition, it can be placed in molds and heated at 60° C. for about two to three hours, and it will pass to the insoluble and infusible condition.

(b) I may also add acids to the soluble form of gum when dissolved in organic solvents such as ethyl alcohol, acetone, amyl alcohol. The acids used may be hydrochloric, benzene sulfonic, sulfuric acid, etc., so that the gum will contain say about 0.5% of acid. The gum will now become insoluble without heat if left over night, or if a greater proportion of acid is used it will become insoluble in a shorter time.

(c) I may also obtain the gum in an insoluble form by heating the soluble with acid as just described, to about 60° C., when it will become infusible in say from 30 to 60 minutes.

(d) Again I may obtain the insoluble from the soluble gum by heating the soluble form to about 60° C., without care being taken to make the gum neutral, or acid when it will harden in about 24 hours.

(e) Again the soluble gum may be heated to say 150° C. under pressure of 100 to 150 pounds for two hours without neutralizing or acidifying the gum, when it will become insoluble.

(f) By following the above procedures and adding salts such as ferric chlorid, aluminum chlorid, ammonium chlorid, zinc chlorid, etc., the conversion of the soluble into the insoluble, or into the infusible, condition will be accelerated.

The product obtained by the condensation of hexamethylenetetramin above disclosed is a gum having the same properties as the gums obtained by condensing dioxy-diphenyl-dimethyl-methane with formaldehyde by means of alkali. No condensing agent is necessary in case of the hexamethylenetetramin product as it is a condensation of ammonia with formaldehyde, and ammonia has the property of the alkali used in the description above.

It is obvious that those skilled in the art may vary the above procedure without departing from the spirit of my invention and therefore I do not wish to be limited by this disclosure except as may be required by the claims.

What I claim is:—

1. An insoluble substance, which may be produced by heating the condensation product of a substance of the class

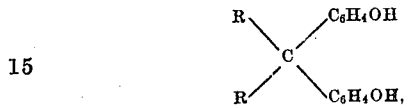

(in which R represents an alkyl radical), and a substance containing at least one active methylene group, said substance being insoluble, and unacted upon by acids, alkalis, acetone, alcohol, amyl alcohol, amyl acetate, glacial acetic acid, acetylene tetrachlorid, or mixtures of these, being hard, indorous, transparent, non-brittle and burning only when held in a flame or under other similar conditions, as described.

2. A process of making an insoluble, substantially non-combustible substance, comprising reacting upon a body having the formula

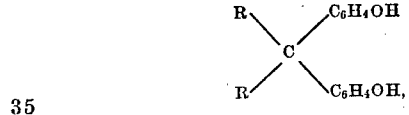

(in which R represents an alkyl radical) with a substance containing at least one active methylene group and then heating the resulting condensation product.

3. A process of making an insoluble, substantially non-combustible substance, comprising reacting upon a body having the formula

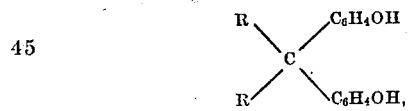

(in which R represents an alkyl radical) with a substance containing at least one active methylene group, in the presence of an alkali, and then heating the resulting condensation product.

4. A process of making an insoluble, substantially non-combustible substance, comprising reacting upon a body having the formula

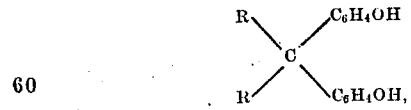

(in which R represents an alkyl radical) with a substance containing at least one active methylene group, in the presence of a condensing agent, and then heating the resulting condensation product.

5. A process of making an insoluble, substantially non-combustible substance, comprising reacting upon a body having the formula

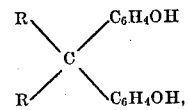

(in which R represents an alkyl radical) with a substance containing at least one active methylene group, in the presence of an alkali at a temperature of about 100 to 150° C., and then heating the resulting condensation product.

6. A process of making an insoluble, substantially non-combustible substance, comprising reacting upon a body having the formula

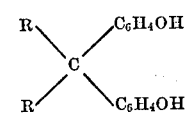

(in which R represents an alkyl radical) with a substance containing at least one active methylene group and then heating the resulting condensation product to such a temperature, and for such a length of time that an insoluble non-brittle, transparent product is produced.

7. A process of making an insoluble, substantially non-combustible substance, comprising reacting upon a body having the formula

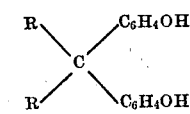

(in which R represents an alkyl radical) with a substance containing at least one active methylene group, in the presence of an alkali at a temperature of about 100 to 150° C., and then heating the resulting condensation product to such a temperature, and for such a length of time that an insoluble non-brittle, transparent product is produced.

8. A process of making an insoluble product which comprises treating dioxy-diphenyl-dimethyl-methane with a substance containing at least one active methylene group, separating the gummy reaction product from the other substances present, and heating the former to a temperature and for a length of time suitable to produce the desired insoluble product.

9. A process of making an insoluble product which comprises treating dioxy-diphenyl-dimethyl-methane with a substance containing at least one active methylene group, in the presence of a condensing agent, separating the gummy reaction product from the other substances present, and heating the former to a temperature and for a length of time suitable to produce the desired insoluble product.

10. A process of making an insoluble product which comprises treating dioxy-diphenyl-dimethyl-methane with a substance containing at least one active methylene group, in the presence of an alkali, separating the gummy reaction product from the other substances present, and heating the former to a temperature and for a length of time suitable to produce the desired insoluble product.

11. A process of making an insoluble product which comprises treating dioxy-diphenyl-dimethyl-methane with a substance containing at least one active methylene group, in the presence of an alkali, at about 90° to 150° C., separating the gummy reaction product from the other product or products present, and heating the former to a temperature and for a length of time suitable to produce the desired insoluble product.

12. A process of making an insoluble product which comprises treating dioxy-diphenyl-dimethyl-methane with a substance containing at least one active methylene group, in the presence of ammonia, separating the gummy reaction product from the other product or products present, and heating the former to a temperature and for a length of time suitable to produce the desired insoluble product.

13. A process of making an insoluble product which comprises treating dioxy-diphenyl-dimethyl-methane with a substance containing at least one active methylene group, in the presence of ammonia at about 90° to 150° C., separating the gummy reaction product from the other product or products present, and heating the former to a temperature and for a length of time suitable to produce the desired insoluble product.

14. A process of making an insoluble product which comprises treating dioxy-diphenyl-dimethyl-methane with a substance containing at least one active methylene group, in the presence of a condensing agent and water, separating the gummy reaction product from the other substances present, and heating the former to a temperature and for a length of time suitable to produce the desired insoluble product.

15. A process of making an insoluble product which comprises treating dioxy-diphenyl-dimethyl-methane with an aldehyde, separating the gummy reaction product from the other product or products present, and heating the former to a temperature and for a length of time suitable to produce the desired insoluble product.

16. A process of making an insoluble product which comprises treating dioxy-diphenyl-dimethyl-methane with an aldehyde, in the presence of an alkali, separating the gummy reaction product from the other product or products present, and heating the former to a temperature and for a length of time suitable to produce the desired insoluble product.

17. A process of making an insoluble product which comprises treating dioxy-diphenyl-dimethyl-methane with an aldehyde, in the presence of an alkali, at about 90° to 150° C., separating the gummy reaction product from the other product or products present, and heating the former to a temperature and for a length of time suitable to produce the desired insoluble product.

18. A process of making an insoluble product which comprises treating dioxy-diphenyl-dimethyl-methane with an aldehyde, in the presence of ammonia at about 90° to 150° C., separating the gummy reaction product from the other product or products present, and heating the former to a temperature and for a length of time suitable to produce the desired insoluble product.

19. A process of making an insoluble product which comprises treating dioxy-diphenyl-dimethyl-methane with formaldehyde, separating the gummy reaction product from the other product or products present, and heating the former to a temperature and for a length of time suitable to produce the desired insoluble product.

20. A process of making an insoluble product which comprises treating dioxy-diphenyl-dimethyl-methane with formaldehyde, in the presence of a condensing agent, separating the gummy reaction product from the other product or products present, and heating the former to a temperature and for a length of time suitable to produce the desired insoluble product.

21. A process of making an insoluble product which comprises treating dioxy-diphenyl-dimethyl-methane with formaldehyde, in the presence of an alkali, at about 90° to 150° C., separating the gummy reaction product from the other product or products present, and heating the former to a temperature and for a length of time suitable to produce the desired insoluble product.

22. A process of making an insoluble product which comprises treating dioxy-diphenyl-dimethyl-methane with formaldehyde, in the presence of ammonia, separating the gummy reaction product from the other product or products present, and heating the former to a temperature and for a length of time suitable to produce the desired insoluble product.

23. A process of making an insoluble product which comprises treating dioxy-diphenyl-dimethyl-methane with formaldehyde, in the presence of ammonia at about 90° to 150° C., separating the gummy reaction product from the other substances present, and heating the former to a temperature and for a length of time suitable to produce the desired insoluble product.

24. A process of making an insoluble product which comprises treating dioxy-diphenyl-dimethyl-methane with formaldehyde, in the presence of a condensing agent, and water, separating the gummy reaction product from the other product or products present, and heating the former to a temperature and for a length of time suitable to produce the desired insoluble product.

25. A process of making an insoluble product which comprises treating dioxy-diphenyl-dimethyl-methane with a substance containing at least one active methylene group, separating the gummy reaction product from the accompanying substances, heating said gummy reaction product to a temperature of 100° to 150° C., until the desired insoluble product is obtained.

26. A process of making an insoluble product which comprises treating dioxy-diphenyl-dimethyl-methane with an aldehyde in the presence of an alkaline condensing agent to produce a gummy mass, and then heating this latter.

27. A process of producing an insoluble substance comprising heating a substance having the formula

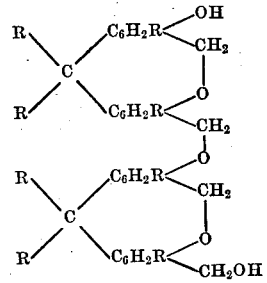

in which R represents an alkyl radical.

28. A process of producing an insoluble substance comprising heating a substance having the formula

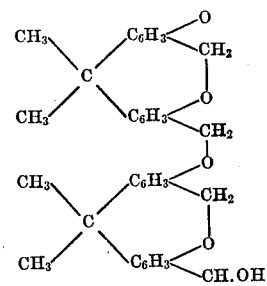

In testimony whereof I affix my signature in presence of two witnesses.

WALLACE APPLETON BEATTY.

Witnesses:
T. A. WITHERSPOON,
J. H. SIGGERS.